March 4, 1947.  L. W. HILLS  2,416,693
CONTAINER CONSTRUCTION
Filed Aug. 6, 1943
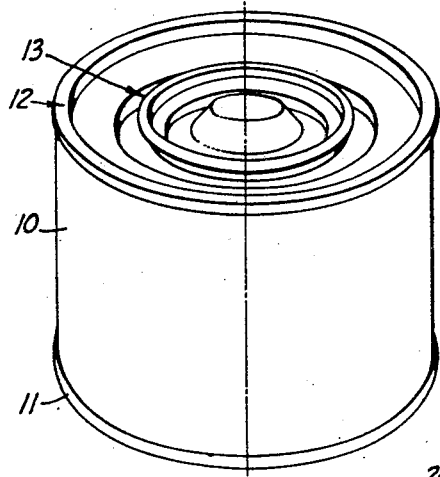
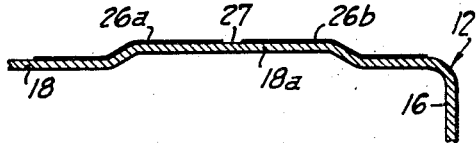
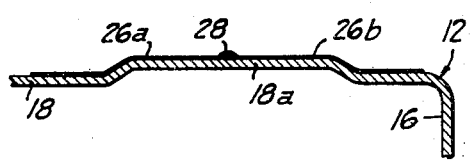
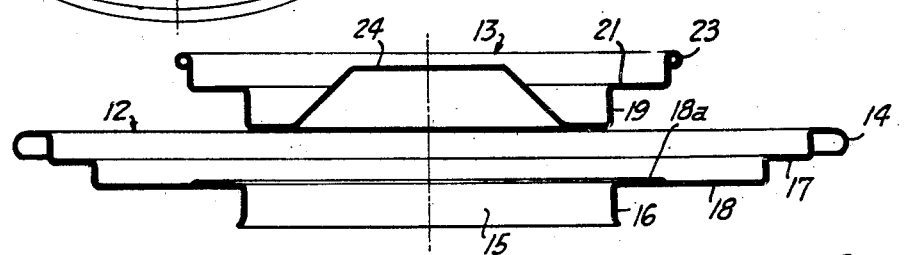
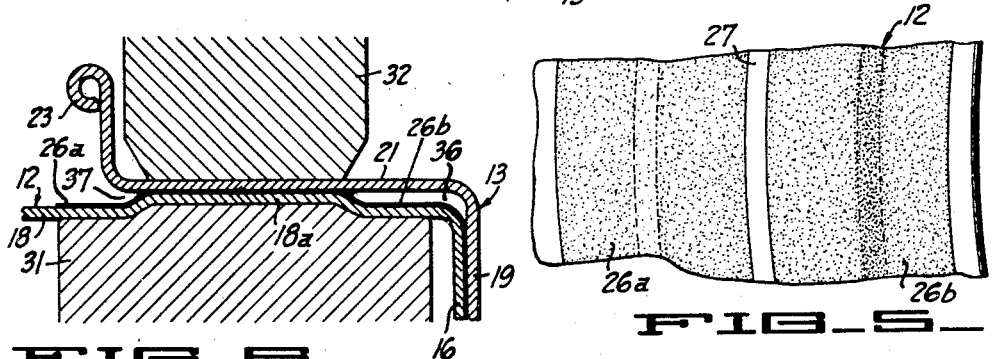
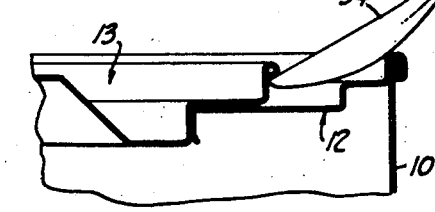
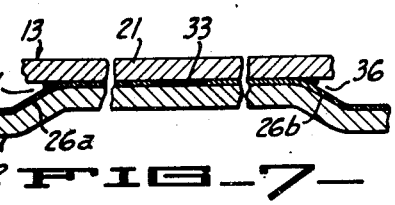
INVENTOR
Leslie W. Hills
BY
ATTORNEY Patented Mar. 4, 1947

2,416,693

UNITED STATES PATENT OFFICE 2,416,693

CONTAINER CONSTRUCTION

Leslie W. Hills, San Francisco, Calif., assignor to Hills Bros. Coffee, Inc., San Francisco, Calif., a corporation of California Application August 6, 1943, Serial No. 497,641

10 Claims. (Cl. 220—81)

1

This invention relates generally to container constructions of the type disclosed and claimed in my co-pending application Serial No. 448,931, filed June 29, 1942.

In my above mentioned co-pending application there is disclosed a hermetically sealed container having a cover part soldered to one wall and adapted to be removed by simple prying action, without permanent distortion or mutilation of either the cover or the container walls. After such removal the cover can be returned to frictional engagement with the opening in the container, to provide a fair degree of protection for the contents of the can. In order to provide a soldered seal which can be readily broken by simple prying action, the width of the solder connection is limited to a value of about four times or less the gauge of the metal walls. This is accomplished by providing the container wall, the cover, or both, with narrow circular ribs or ridges surrounding the opening in the container, whereby only a limited width of solder can be applied to the end face of the same.

An object of the present invention is to provide a container construction embodying the generic features of the invention disclosed in said co-pending application, but without the utilization of a relatively narrow rib or ridge for limiting the width of the soldered seal. More specifically the present invention has for its object the provision of a simplified construction of the above character, which can be manufactured at reduced cost.

A further object is to provide a frangible air tight solder seal utilizing a minimum amount of solder.

Further objects of the invention will appear from the following description in which the preferred embodiment has been set forth in conjunction with the accompanying drawing.

Referring to the drawing:

Figure 1 is a perspective view, illustrating a complete container incorporating the present invention.

Figure 2 is an enlarged side elevational view in cross-section, showing the cover and ring parts forming the top of the container shown in Figure 1.

Figure 3 is a greatly enlarged cross-sectional detail showing the manner in which areas of the ring part are treated to prevent adherence with solder, and to thereby limit the width of the solder seal.

Figure 4 is an enlarged sectional detail like Figure 3, but after solder has been applied.

Figure 5 is a plan view of Figure 3 showing a portion of the ring part provided with concentric areas treated to inhibit adherence to soldier.

Figure 6 is a greatly enlarged sectional detail

2 showing the manner in which the cover and ring parts are sealed together.

Figure 7 is a greatly enlarged detail illustrating the solder seal formed after the operation shown in Figure 6.

Figure 8 is a side elevational view in cross-section, showing the cover and ring parts assembled with the side walls of a can, and indicating how the cover parts can be pried loose by a simple instrument, such as a spoon.

The container illustrated in Figure 1 is suitable for the marketing of various products, as for example coffee, spices, dehydrated vegetables, paints, or the like. Following conventional designs the side walls 10 can be cylindrical, with the bottom metal wall 11 double seamed to the side walls. The top of the container includes a ring part 12, which is double seamed or otherwise attached to the upper edge of the side walls 10, together with a cover part 13. It is this cover part which is solder sealed to the ring part 12, and which can be pried open by the use of a common utensil.

Referring now to the enlarged Figure 2, the ring part is shown provided with a turned peripheral edge 14, adapted to form a double seam or like sealed connection with the side walls of the container. The opening 15 in this ring part may be formed circular or oval, depending upon the particular design desired. Assuming that the cover after being removed is to be returned into frictional engagement with the opening to protect the contents of the container against deterioration, it is desirable to provide the ring part with a down-turned flange or collar 16. Between this collar and the outer peripheral edge of the ring part, it is desirable to provide offset areas, in order to lend strength. Thus from the outer margin the metal is offset inwardly to form the annular portion 17, and is further offset inwardly to form the portion 18, to which the flange 16 is connected.

The cover part 13 is pressed to a form such as will frictionally fit within the collar 16, and to provide an area which can be solder sealed to the portion 18, as will be presently described. Also the cover part is formed to provide a flange or like portion to form prying means. Thus in this instance the sheet metal forming the cover is pressed to provide the substantially cylindrical portion 19, adapted to frictionally fit within collar 16, a substantially planar wall portion 21 adapted to overlie a part of wall portion 18, and a peripheral turned or reinforced edge 23. Inwardly of the cylindrical portion 19, the cover may be crowned as indicated at 24, in order to increase the useful internal space or volume of the container.

In the manufacture of the parts described certain surface areas are provided of such a character as to inhibit or repel adherence to molten solder, except for a narrow strip of metal which is made susceptible to adherence with solder in forming the desired air tight seal. Such surface areas can be formed in various ways such as by treating the surfaces of the metal with chemicals, or by applying solder repellent coatings of various substances. For example it is satisfactory to employ a lithographing lacquer applied by conventional methods. While such treated areas can be applied to the cover, it is more convenient in most instances to form them on the upper face of the ring part. Thus referring to Figures 3 and 5, the films 26a and 26b are applied to the outer face of the wall portion 18, in such a manner as to leave a relatively narrow strip 27 of exposed metal which is susceptible to adhesion with solder. It is desirable to have this strip not wider than about four times the thickness of the sheet metal used in making the cover and ring parts.

Following coating of the ring part in the manner described, a suitable flux is applied to the narrow exposed strip 27 and this area is then tinned with a suitable soft solder, preparatory for the final sealing operation. Various procedures can be employed for this purpose, although I prefer in this connection to make use of the machine and method disclosed and claimed in co-pending application Serial No. 497,646, entitled Solder applying machine and method, and filed of even date. Use of this machine and method will result in application of a narrow ridge 28 of solder to the exposed strip 27, substantially as shown in Figure 4. This ridge of solder will have a width corresponding to the distance between the edges of the films and will have a thickness considerably greater than the thickness of the films of coating material.

After preparation of the ring part as described, the cover and ring parts are assembled together preparatory for final sealing. In this connection I prefer to make use of the machine and method disclosed in co-pending application Serial No. 497,647, entitled Solder sealing machine and method, and filed simultaneously herewith, which makes use of a support 31 for the ring part, together with a contact wheel 32 which presses into engagement with the cover part over the region where the seal is being made. The contact wheel is rolled about an axis radial to the axis of the cover and simultaneously an electrical current is applied between the wheel and the support to cause current flow between the cover and ring parts and through the applied solder, thus causing localized heating with melting of the solder. In this way a continuous soldered connection is formed between the cover and ring parts.

Figure 7 shows the soldered seal formed between the cover and ring parts after the final soldering operation. The fused soldered seal 33 is shown formed between the adjacent edges of the films 26a and 26b, and between the adjacent surfaces of the cover and ring parts.

Some lateral flow of molten solder takes place during the final sealing operation, and it is desirable to provide means whereby such lateral flow will not cause a soldering together of portions beyond the areas 26a, 26b. This can be accomplished by providing an upward offset 18a in the wall portion 18 of the ring part, and which extends on both sides of the exposed strip 27. In forming the treated areas this offset portion is completely covered, as shown in Figure 3, and in addition the treated areas are extended for a substantial distance beyond the inner and outer shoulders of the offset. In the final assembly this offset forms annular spaces 36 and 37 which completely block any flow of molten solder beyond the limits of areas 26a and 26b. Figure 7 indicates a small amount of solder in spaces 36 and 37 and makes clear that such solder can do no harm in that it can not form an undesired connection between the cover and ring parts.

In Figures 3, 4 and 5 the film or surfacing 26b is shown terminating short of the collar 16. Fig. 6 shows how this film can be extended over the inner surface of collar 16, thus electrically insulating portions 16 and 19 and further insuring against possible soldering together of these portions during the final solder sealing operation.

The completed cover-ring assemblies are applied to packed or empty cans or containers, and then the containers are completed by passing the same through a conventional double seamer. Before the double seaming operation the interior of the can may be evacuated.

The cover-ring assembly as described forms an end for the container having sufficient strength to withstand the varying degrees of vacuum or internal pressure to which the same may be subjected. When one desires to open a container a simple instrument such as the end of a spoon 34 or screw driver is placed below the cover edge 23, and this edge pried upwardly. Such prying action serves to break the solder seal 33 and to permit the cover to be removed. Thereafter the cover can be returned to its normal position upon the ring part, to form a usable friction top or cap which will protect the contents of the can while the same are being used. This is made possible because the prying action to break the solder seal does not cause such mutilation or permanent deformation of the cover or ring portions as would prevent return of the cover to form a secondary seal.

Previous reference has been made to the necessity of utilizing a relatively narrow solder seal to enable the breaking of this seal by prying action, without serious mutilation of the cover or ring parts. In a typical instance where the cover and ring parts are made of conventional black or tinned sheet iron, this metal may be of a thickness of say 0.011 of an inch, and the width of the solder seal may vary from say 0.02 to 0.044 of an inch. Conventional soft solders can be used, as for example a solder formed of 50% lead and 50% tin. It will be evident that the ease with which the cover is removed and the solder seal broken, can be varied in practice by variations in the width of the solder seal, and variations in the type of solder employed.

It will be seen from the foregoing that the present invention accomplishes the result of limiting the solder seal to a relatively narrow strip, which can be readily broken away by prying forces, and with a relatively simple construction which does not require the use of narrow ridges or ribs formed in either the cover or ring parts. Therefore the present invention is particularly adapted to low cost quantity production.

I claim:

1. In a container construction wherein a metal wall part of the container is provided with an opening for access into the interior of the container, the improvement comprising solder repellent surface areas formed on the wall and separated by a continuous narrow strip of exposed metal surrounding the opening and tinned with solder.

2. In a container construction wherein a metal wall part of the container is provided with an opening for access into the interior of the container, the opening being closed by a cover part having an annular portion in juxtaposition with a region of the wall surrounding the opening, the improvement comprising solder repellent surface areas formed on one of the parts in the region surrounding the opening, the areas being separated by a continuous narrow strip of exposed metal surrounding the opening, and the solder seal between the wall and cover parts and confined to said narrow strip.

3. In a container construction wherein a metal wall part of the container is provided with an opening for access into the interior of the container with the opening being closed by a cover part, the improvement comprising solder repellent surface areas on one of the parts and in a region surrounding the opening, said areas being separated by a continuous narrow strip of exposed metal, said strip having a width of not more than four times the thickness of the metal wall, and a solder seal between the wall and cover parts and confined to said narrow strip.

4. In a container construction wherein a metal wall part of the container is provided with an opening for access into the interior of the container with the opening being closed by a cover part, the improvement comprising solder repellent surface areas on one of the parts and in a region surrounding the opening, the areas being separated by a continuous narrow strip of exposed metal extending about the opening and adapted to receive solder, a solder seal between the strip and the other part, and means carried by the cover to enable prying of the same from the opening.

5. In a container construction wherein a metal wall part of the container is provided with an opening for access into the interior of the container, a cover part formed with an annular portion proportioned to have frictional engagement with the opening and also having a wall portion in juxtaposition with a region of the wall part surrounding the opening, solder repellent surface areas formed on one of the parts in said region, said areas being separated by a narrow continuous strip of metal adapted to receive solder and surrounding the opening, a solder seal formed between the strip of metal and the other part, and means carried by the cover to enable prying of the same to break the solder seal.

6. In a container construction wherein a metal wall part of the container is provided with an opening for access into the interior of the container, a cover part formed with an annular portion proportioned to have frictional engagement with the opening and also having a wall portion in close juxtaposition with a region of the wall part surrounding the opening, solder repellent surface areas formed on one of the parts in said region, said areas being separated by a narrow continuous strip of metal adapted to receive solder, said strip surrounding the opening and spaced outwardly from the same, a solder seal formed between the strip of metal and the other part, and means carried by the cover to enable prying of the same to break the solder seal.

7. In a container construction wherein a metal wall part of the container is provided with an opening for access into the interior of the container, the improvement comprising solder repellent surface areas formed on the wall and separated by a continuous narrow strip of exposed metal adapted to receive solder and surrounding the opening, said narrow strip being adapted to underlie and to be sealed with respect to the cover by a frangible continuous line of solder.

8. In a container construction wherein a metal cover part is adapted to hermetically seal an opening in a metal wall, the improvement comprising solder repellent surface areas formed on one face of the cover and separated by a continuous narrow strip of exposed metal adapted to receive solder, the strip being adapted to surround the opening of the container and to be sealed with respect to the container by a frangible continuous line of solder.

9. In a container construction wherein a metal wall part of the container is provided with an opening for access into the interior of the container, the opening being closed by a cover part having an annular portion in juxtaposition with a region of the wall surrounding the opening, the improvement comprising solder repellent surface areas interposed between the parts in the region surrounding the opening, the areas being separated by a continuous narrow strip of exposed metal surrounding the opening, and a solder seal between the wall and cover parts and confined by said areas to said strip.

10. In a container construction wherein a metal wall part of the container is provided with an opening for access into the interior of the container, a cover part formed with an annular portion proportioned to have frictional engagement with the opening and also having a wall portion in close juxtaposition with a region of the wall part surrounding the opening, solder repellant surface areas interposed between said wall parts in said region, said areas being separated by a narrow continuous gap surrounding the opening and spaced outwardly from the same, a solder seal formed between the parts and through said gap, and means carried by the cover to enable prying of the same to break the solder seal.

LESLIE W. HILLS.

REFERENCES CITED

The following references are of record in the file of this patent:

UNITED STATES PATENTS

| Number | Name | Date |
|---|---|---|
| 924,452 | Graham | June 8, 1909 |
| 672,347 | Besse et al. | Apr. 16, 1901 |
| 1,789,788 | Sundquist | Jan. 20, 1931 |
| 182,905 | Drummond | Oct. 3, 1876 |
| 1,848,290 | Young | Mar. 8, 1932 |
| 1,966,070 | Lahey | July 10, 1934 |
| 1,673,693 | McLelland | June 12, 1928 |
| 185,563 | Moore | Dec. 19, 1876 |
| 1,451,869 | De Land | Apr. 17, 1923 |
| 2,229,275 | Burns | Jan. 21, 1941 |
| 124,171 | Spencer | Feb. 27, 1872 |
| 717,710 | Norton | Jan. 6, 1903 |
| 2,259,822 | Kienlen | Oct. 21, 1941 |
| 1,691,394 | Karl | Nov. 13, 1928 |
| 2,268,297 | O'Neil | Dec. 30, 1941 |
| 1,029,686 | Hulme | June 18, 1912 |